March 25, 1952  F. K. BROWN  2,590,597
METHOD OF SLOTTING THE SHANKS OF SCREW FASTENERS
Filed July 22, 1949  2 SHEETS—SHEET 1
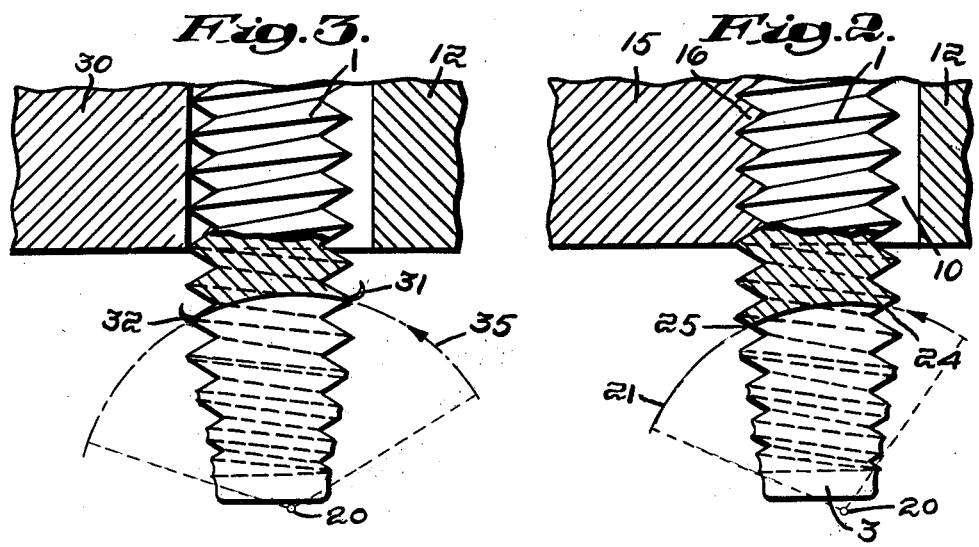
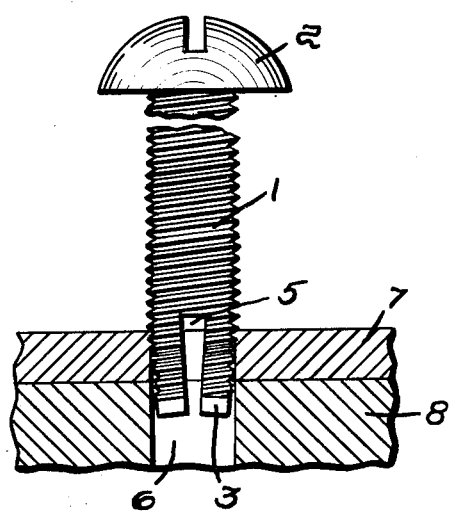
Inventors:
Frank K. Brown
James R. Hodder
by
Attorney March 25, 1952 F. K. BROWN 2,590,597
METHOD OF SLOTTING THE SHANKS OF SCREW FASTENERS
Filed July 22, 1949 2 SHEETS—SHEET 2
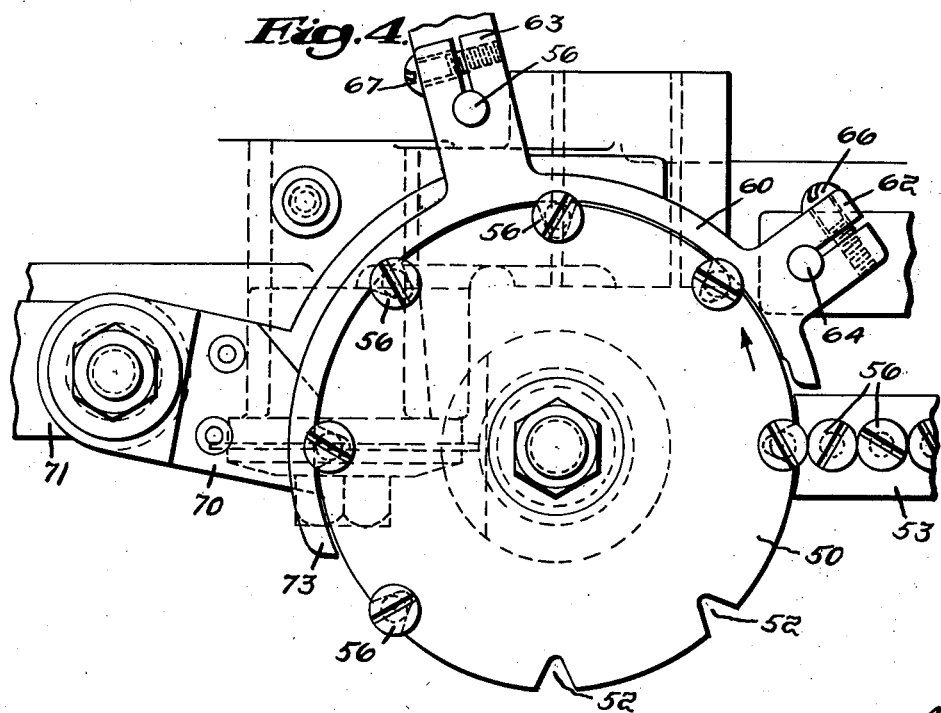
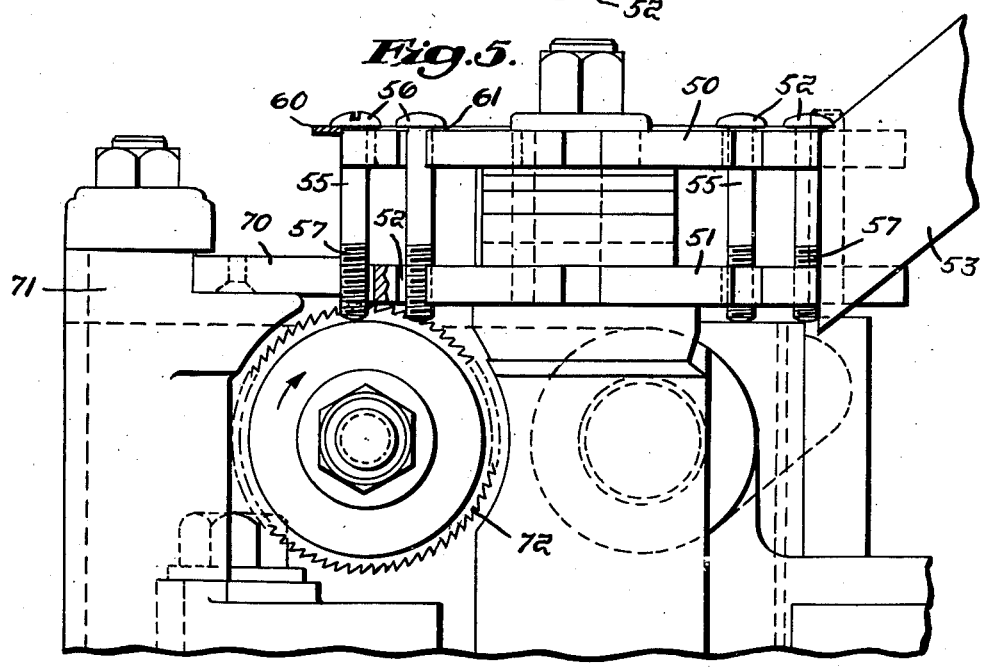
Inventor:
Frank K. Brown
by James R. Hodder
Attorney

UNITED STATES PATENT OFFICE 2,590,597

METHOD OF SLOTTING THE SHANKS OF SCREW FASTENERS

Frank K. Brown, South Dartmouth, Mass., assignor to Research Engineering & Manufacturing, Inc., New Bedford, Mass., a corporation of Massachusetts Application July 22, 1949, Serial No. 106,232

1 Claim. (Cl. 10—2)

My present invention is a novel and improved method of slotting the pilot or entering end portion of a threaded fastener, particularly of the type known as a self-tapping screw, and is an improvement on the fastener illustrated in my prior Pat. No. 2,292,195, dated August 4, 1942, and includes a novel method of performing the slotting operation.

As explained in my said prior patent, it is an important object to so form such self-tapping screws, which are intended to be fitted into a pre-bored opening, aperture, recess or bore in the article or articles to which they are to be applied, so as to receive and retain the fastener in proper alignment for the subsequent driving operation.

Heretofore the slots in the pilot end of such fasteners have been made by a rotating saw, which is reciprocated toward and from the fastener to be slotted as the latter are fed in a carrier to the saw-cutting position, and as the threaded fastener is liable to turn or to be rotated while in the carrier, the depth of the resultant saw-cut and, hence, the slot formed has heretofore resulted in objectionable burrs being caused by the saw-cut. Such burrs were even formed to such an extent as to destroy the self-threading action in the subsequent driving-home of the fastener and, thus, seriously impaired the holding capacity of the threads. Therefore, prior to my present invention, the depth of the saw-cut in the pilot end of the fastener varied relatively with the flanks of the threads, particularly at the depth of the slot dependent on the relative rotative positioning of the fastener and the saw-cut, the saw-cut being liable to enter and leave the side flanks or faces of the threads at such an angle as to create and leave the objectionable burrs above noted.

I have discovered that by so holding and positioning a threaded fastener in a predetermined and relative relation with the rotating saw as to always insure the entering saw-cut at an acute angle with the side flank of the threads and with the saw-cut emerging from the same side of the flank of the thread between the crest and base in a line as nearly perpendicular to the flank that these objectionable burrs are eliminated.

Thus, by my novel improved process of predetermining the relative position of the fastener as it is held in the carrier and during the slotting and saw-cutting action, wherein the saw enters the side or flank of the thread at an acute angle, the burr tending to be formed at this entering point is wiped in and eliminated. Also, the position of the saw-cut at its extreme depth emerging from the opposite flank of the thread at a nearly perpendicular line prevents the forming of a burr at this point of emergence.

I have also discovered that in order to carry out the above process, it is desirable to position the saw at a point eccentric with the axis of the fastener being slotted, which thus still further enables the saw-cut to form a slot free of burrs either at the entering or leaving face of the fastener threads at the bottom of the slot so cut. Thus, in combination with means to automatically position and hold the fastener in the desired relative position with the saw, the cut will both enter and leave a flank of the thread at the base of the slot. Thereby, the formation of burrs is eliminated and the consequent holding capacity of the screw threads as they are driven into the article, or articles, is maintained unimpaired.

My process has the further important advantage of automatically making perfectly slotted screw fasteners without the necessity heretofore required of inspecting the same for burrs. Previously, such burrs were likely to be formed and, therefore, all slotted screws were required to go thru an inspection operation wherein an operator had to pick out the damaged screws where a burr was formed, and these damaged screws had to be again rolled to remove the burr at either or both sides at the base of the slot.

Such re-rolling was also disadvantageous because it frequently resulted in pinching the points of the slotted opening, which required still further inspection to pick out and remove the fasteners thus damaged by pinching.

In order to carry out my process above briefly outlined, I have devised a novel machine which includes a rotating carrier, receiving threaded fasteners from a raceway, separating the same, and moving them step by step in slotting position so that the saw-cutting operation can be performed. For this purpose, also, I have devised a novel threaded gripper which will engage the threads of the fastener irrespective of the rotative position of the fastener as it is found in the carrier just before reaching the saw-slotting position; whereupon the threaded gripper will raise or lower the fastener in order to insure the cutting action at the desired acute angle at the entering cut of the saw and for the relatively perpendicular action at the leaving end of the saw-cutting in the flank of the threads to carry out the process as above explained and to eliminate the formation of burrs.

While my invention can be applied to any desired type of slotted fastener, I prefer to utilize same in connection with the type illustrated in my said prior patent wherein a straight pilot section below the threaded part is formed on the fastener, which is also illustrated in my said patent.

Referring to the drawings illustrating my present improved process:

Fig. 1 is a diagrammatic view illustrating the type of fastener with a slot formed in the pilot or entering end and fitted in a pre-bored opening in the pair of articles to which the fastener is to be applied;

Fig. 2 is an enlarged fragmentary view in cross-section illustrating the relative eccentric position of the saw and the line of cut at the depth of the base of the slot, wherein the entering line of cut is at a relatively acute position on the flank of the thread between the crest and base of same, and the emergence of the line of cut is approximately at a right angle with the flank of the thread, together with the threaded gripper illustrated in diagrammatic form which automatically positions the threads in desired position relative to the line of saw-cut;

Fig. 3 is a diagrammatic view of the former method of holding a threaded fastener with a non-threaded gripper and wherein a saw-cut even with the center of the saw eccentric to the axis of the fastener would result in forming burrs both at the entering and leaving faces of the threads;

Fig. 4 is a fragmentary plan view of a slot-sawing machine to carry out applicant's process, and Fig. 5 is a corresponding side elevational view.

Referring to the drawings illustrating my present process and improved fastener formed without burrs, 1 indicates a typical threaded self-tapping fastener of the type shown in my said prior patent, with the head 2, pilot end 3, and longitudinal slot 5 thru the pilot end permitting this slotted end to be sprung together slightly when the fastener is positioned in a pre-formed hole or opening 6 in articles 7 and 8 to be held together by the fastener.

As shown in Fig. 2, the threaded portion 2 in the fastener is held between the usual V-shaped slot 10 in the rotatable carrier 12 and my novel threaded gripper 15 as the carrier 12 moves the fastener into alignment for the slotting operation by a circular saw. Such saw would be positioned eccentrically relative to the axis of the fastener with the center of the saw substantially as indicated at 20, and the line of cut at the base of the slot formed being indicated by the dotted line 21.

In my machine, the saw is mounted on a vertically movable yoke which is raised lengthwise of the fastener when the latter is positioned over the saw and which lifting of the saw is limited to the depth of the slot desired. Thereupon my novel threaded gripper 15 when moved into holding position, either raises or lowers the fastener automatically by the self-seating action of the gripper threads 16 on the adjacent threads of the fastener 1. Thus the fastener is held in correct relative position so that the depth of the saw-cut with the saw rotating in a contra-clockwise direction, as indicated by the arrows, will enter the flank of the thread approximately as indicated at 24 at an acute angle and leave the same at a point as indicated at 25 at nearly the perpendicular angle with the flank of the thread, thus eliminating burrs at either the entering or leaving point.

In Fig. 3 I have illustrated the present and prior method and operation of slotting the fastener, wherein the carrier 12 held the fastener 1 and a non-threaded carrier 30 was pressed in contact with the crest of the threads and did not raise or lower the fastener in any predetermined positioning location relatively with the saw-cut but simply held the same with the threaded faces at random, so that the resultant saw-cut might and usually did form entering burrs, as indicated at 31, and leaving burrs, as indicated at 33, on the threads. Even if the saw-cut was eccentric, as also illustrated in Fig. 3, the line of cut 35 entering the threaded portion of the fastener indiscriminately would form the contours at the base of the slot 5.

In order to carry out the process above described, I have illustrated diagrammatically in Figs. 4 and 5 the fragmentary portion of a machine suitable for such purpose. As shown in the drawings, a rotatable blank-carrier comprises horizontal plates 50 and 51, each having edge notches 52 to receive blanks from a raceway 53, which blanks are picked off the raceway 53 as the notches 52 are moved intermittently to register with the delivery end of the raceway 53. These blanks 55 are provided with heads 56 and threaded portions 57 and may be threaded throughout the entire length of the shank, as shown in Fig. 1; or, as shown in Figs. 4 and 5 for illustrative purposes may be partially threaded at their lower end as indicated at 57, which threaded end is the part to be slotted. As the horizontal rotatable plates 50 and 51 pick off the blanks from the raceway, the upper part of each blank fitting in the notches in the top plate 50 and the lower threaded part in the notches of the bottom plate 51 are carried in the direction of the arrow, Fig. 4, where the heads 52 are picked up and lifted by a spring guard 60, which guard thus engages the tops 56 of the screws and holds the same spaced slightly above the top of the upper carrier plate 50, thus holding the tops slightly spaced above the top of the plate 50, as indicated at 61, Fig. 5. The spring guard 60 may be fitted in any desirable manner, and is curved to correspond with the contour of the top carrier plate 50, such guard as herein illustrated having split extensions 62 and 63 adapted to be clamped in adjusted vertical position about studs 64 and 65, extending upward from any suitable part of the machine frame, and held in adjusted position thereon by headed bolts 66 and 67.

The intermittent rotation of the carrier plates 50 and 51 thus feed the screws 55 around where it is engaged by the threaded gripper 70, corresponding to the gripper 15 shown in Fig. 2, which threaded gripper is reciprocated to and from the screw in alignment therewith in engagement with the lower notch 52 in the bottom carrier plate 51, corresponding to the part indicated at 12 in Fig. 2.

The threaded gripper 70 is mounted in adjustable position on a slide 71 which is moved into engagement with the threaded portion of the screw 55 during the intermittent stoppage of the carrier and, simultaneously, the slotting saw 72 is moved upwardly relatively with the carrier plates and the slotting effected.

By means of the spring guard 60 holding the head 56 slightly above the top surface of the upper carrier member 50, the gripper threader 70 will either raise or lower the screw 55 to automatically feed and adjust the screw to the horizontal position of the threaded gripper 70 and thus insure the correct positioning of the bottom part of the screw for the saw-cutting operation, the saw 72 having its center slightly eccentric to the axis of the screw 55 being operated on while thus held in firm position by the threaded gripper, insuring the non-burr cutting operation on the base of the slot thus cut, as above explained. Immediately after the saw-cutting action is completed, the saw 72 moves downwardly and the threaded gripper 70 is retracted on its slide 71 and the step-by-step rotation of the carrier is continued and the now-slotted screw is moved beyond the trailing end 73 of the spring guard 60 and is dropped off into a receptacle.

The slotting saw 72 may be rotated either in a clockwise direction, as shown in Fig. 5, or in a contra-clockwise direction, as illustrated in Fig. 2; as in either case the base of the saw cut enters and leaves the flanks of the diametrically opposite threaded portions in a substantially non-burr forming operation, tending to wipe in the metal and not to force a ridge or burr outwardly.

Thus it will be appreciated that my discovery and invention of the critical position of the cutting saw and the automatic predetermined positioning of the threads of the fastener relative to the saw-cutting operation provides for the formation of a perfectly slotted fastener of the kind described, eliminating the objectionable burrs formerly produced and saving time, expense, delay, and the difficulty of inspecting for burrs, rerolling to remove same or displace them from the thread outline, as well as a subsequent inspection to see if the slot has been distorted by pinching during the rerolling operation.

I claim:

The herein described process of slotting threaded fasteners, which consists in holding the fastener to be slotted by a thread-engaging gripper in alignment with a saw to cut the slot and with the center of the saw eccentric to the axis of the fastener, thereupon effecting relative movement between the fastener and saw lengthwise of the fastener to cut a slot in the same from the pilot end inwardly to a predetermined depth, the depth of the saw-cut being slanting from the entering edge to the emergence, with the entering cut formed on the flank of a thread face at a relatively acute angle and emerging from the same thread face at nearly a right angle, whereupon the tendency to create a burr is eliminated.

FRANK K. BROWN.

REFERENCES CITED

The following references are of record in the file of this patent:

UNITED STATES PATENTS

| Number | Name | Date |
|---|---|---|
| 1,629,705 | Holmeberg | May 24, 1927 |
| 1,909,476 | Trotter | May 16, 1933 |
| 2,224,659 | Stoll | Dec. 10, 1940 |
| 2,239,352 | Cherry | Apr. 22, 1941 |
| 2,292,195 | Brown | Aug. 4, 1942 |